(12) United States Patent
Morita

(10) Patent No.: US 8,346,178 B2
(45) Date of Patent: Jan. 1, 2013

(54) RADIO COMMUNICATION METHOD AND RADIO COMMUNICATION TERMINAL

(75) Inventor: Kugo Morita, Yokohama (JP)

(73) Assignee: Kyocera Corporation, Kyoto (JP)

( * ) Notice: Subject to any disclaimer, the term of this patent is extended or adjusted under 35 U.S.C. 154(b) by 676 days.

(21) Appl. No.: 12/439,136

(22) PCT Filed: Aug. 29, 2007

(86) PCT No.: PCT/JP2007/066814
§ 371 (c)(1),
(2), (4) Date: Sep. 10, 2009

(87) PCT Pub. No.: WO2008/026663
PCT Pub. Date: Mar. 6, 2008

(65) Prior Publication Data
US 2010/0323642 A1 Dec. 23, 2010

(30) Foreign Application Priority Data
Aug. 30, 2006 (JP) .................................. 2006-233830

(51) Int. Cl.
H04B 1/00 (2006.01)
(52) U.S. Cl. .......................................... 455/69; 455/522
(58) Field of Classification Search ..................... 455/69, 455/522, 509, 296
See application file for complete search history.

(56) References Cited

U.S. PATENT DOCUMENTS

| 6,230,022 B1 * | 5/2001 | Sakoda et al. ................. 455/522 |
| 7,907,904 B2 * | 3/2011 | Waltho et al. ................. 455/63.1 |
| 2006/0160550 A1 * | 7/2006 | Edwards ....................... 455/509 |
| 2010/0260086 A1 * | 10/2010 | Santhanam et al. ............ 455/69 |

FOREIGN PATENT DOCUMENTS

| JP | 11-196043 | 7/1999 |
| JP | 2004-260692 | 9/2004 |
| JP | 2005-341623 | 12/2005 |

OTHER PUBLICATIONS

3rd Generation Project Partnership 2, "cdma 2000 High Rate Packet Data Air Interface" 3GPP2 C.S0024-B Version 1.0, pp. i-15-5, May 2006.

* cited by examiner

*Primary Examiner* — Lana N Le
(74) *Attorney, Agent, or Firm* — DLA Piper LLP (US)

(57) ABSTRACT

The present invention is summarized as a radio communication method including the steps of: calculating a transmission power difference between transmission power values of the first carrier and the second carrier; determining whether the transmission power difference exceeds a threshold set on the basis of a maximum transmission power difference allowable between the first carrier and the second carrier; and stopping a transmission of reverse link data using one of the first carrier and the second carrier with a larger transmission power for a certain period in a case where the transmission power difference exceeds the threshold set on the basis of the maximum transmission power difference.

2 Claims, 12 Drawing Sheets

FIG. 5
(a)
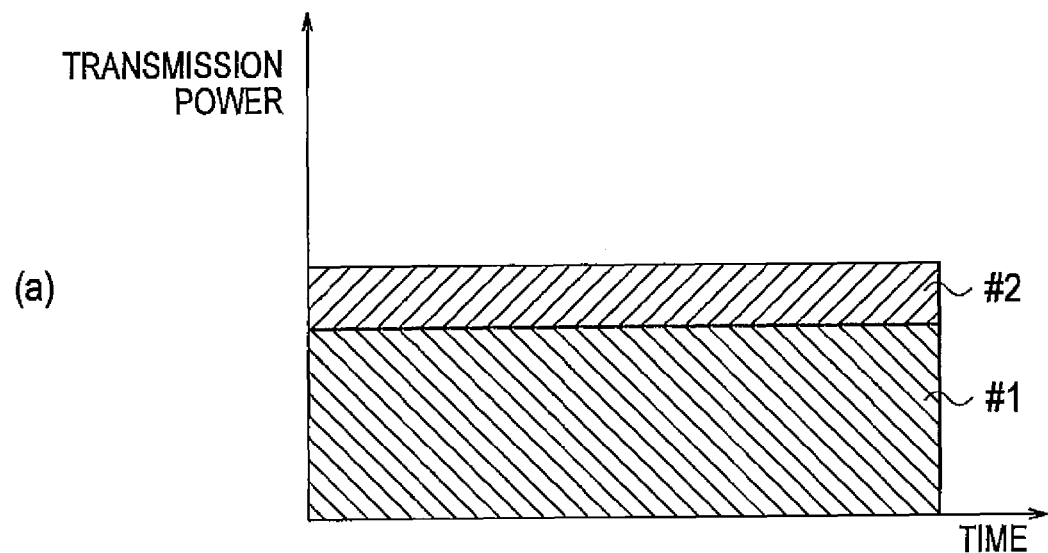
(b)
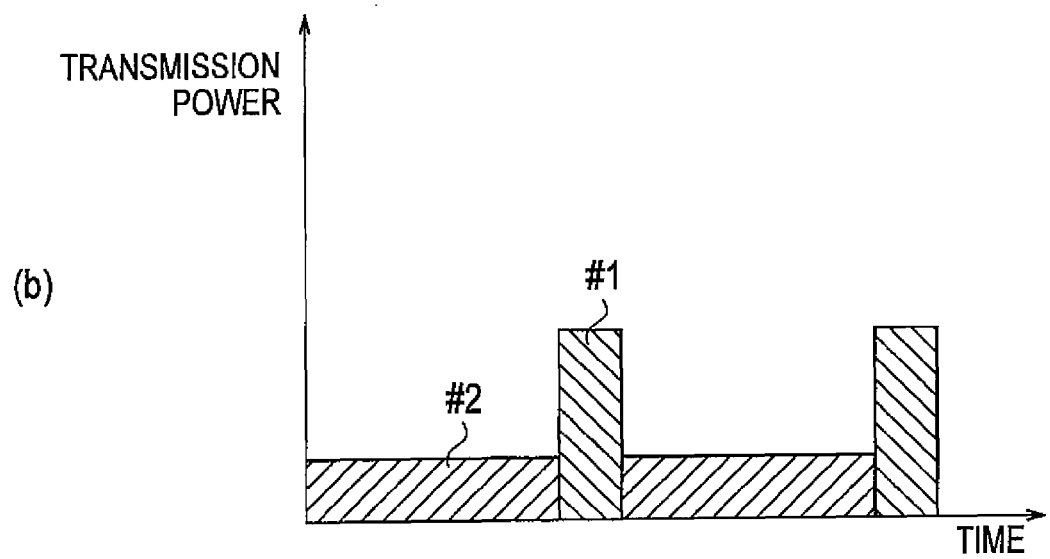

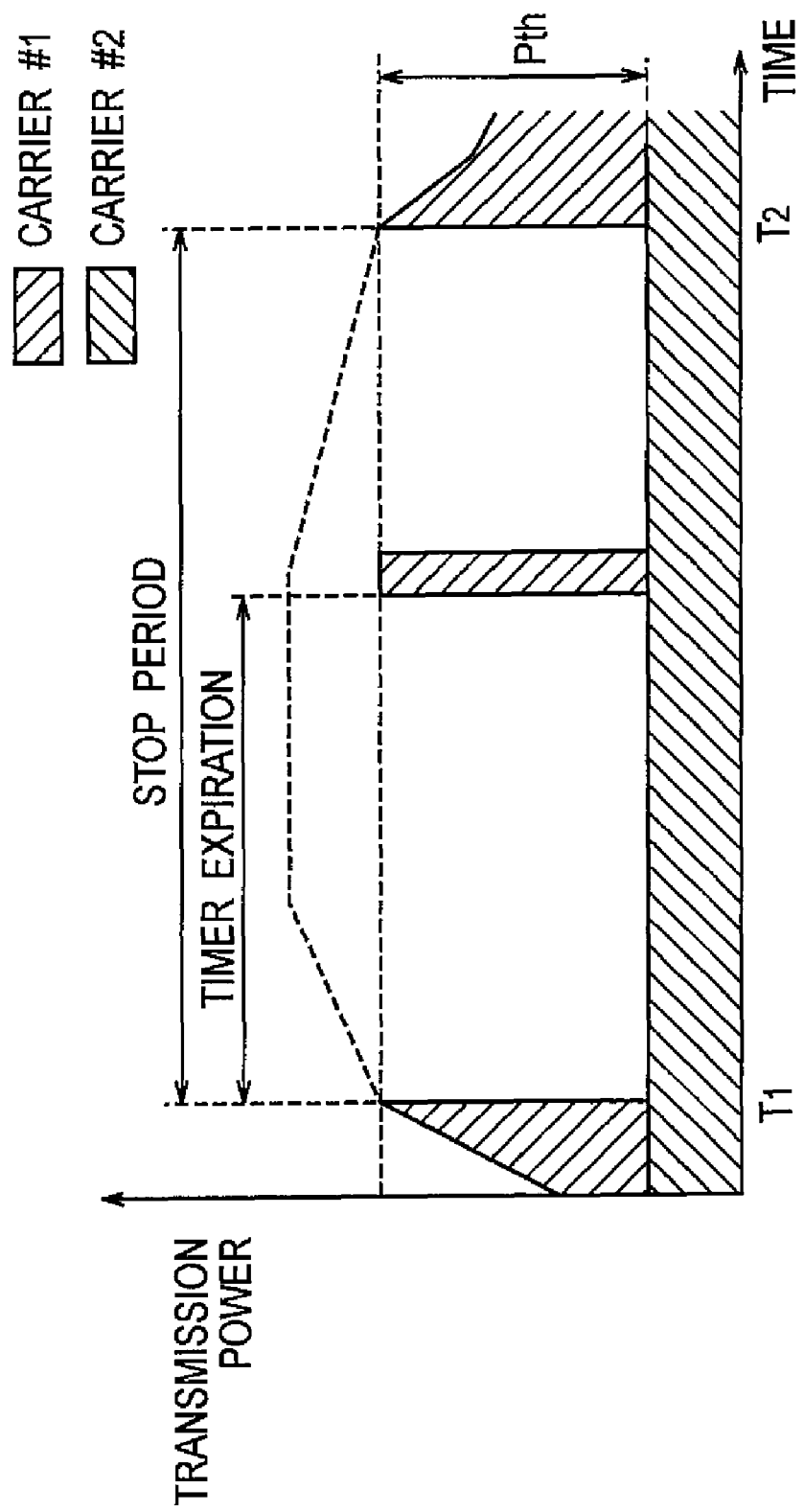

RADIO COMMUNICATION METHOD AND RADIO COMMUNICATION TERMINAL

This application is a national stage of international application No. PCT/JP2007/066814 filed on Aug. 29, 2007, which also claims priority to and the benefit of Japanese Patent Application No. 2006-233830 filed Aug. 30, 2006, the entire contents of which are incorporated herein by reference.

TECHNICAL FIELD

The present invention relates to a radio communication method in reverse link by multicarrier using multiple carriers, and to a radio communication terminal performing communications by multicarrier.

BACKGROUND ART

In recent years, as applications, such as moving images or games, to be handled have been diversified and sophisticated, the data transmission rate in a mobile communication system has been strongly demanded to be speeded up. With such a background, the Third Generation Partnership Project 2 (3GPP2), for example, defines a scheme for implementing high speed data transmissions by using multiple carriers bundled in a upper layer (so-called multicarrier).

In the case of multicarrier, a radio communication terminal (Access Terminal) generally employs a configuration in which multiple carriers are transmitted by use of a single radio communication circuit, in view of downsizing, reduction in manufacturing cost or the like. Thus, in order to reduce interference between adjacent carriers that are adjacent to each other with a predetermined frequency interval (1.25 MHz interval), it is provided that a transmission power difference between adjacent carriers should be within a predetermined threshold (MaxRLTxPwrDiff, 15 dB, for example) (Non-patent document 1, for example).
Non-patent document 1: "cdma2000 High Rate Packet Data Air Interface 3GPP2 C.S0024-B Version 1.0", 3GPP2, June 2006

DISCLOSURE OF THE INVENTION

As described above, 3GPP2 provides that a transmission power difference between adjacent carriers be controlled to be within a predetermined threshold (MaxRLTxPwrDiff). In some cases, however, the transmission power difference cannot be maintained within the predetermined threshold under some communication conditions between a radio communication terminal and a radio base station (Access Network).

For example, when a radio communication terminal moves away from a first radio base station that is currently performing communications by use of a first carrier and simultaneously moves toward a second radio base station that is currently performing communications by use of a second carrier adjacent to the first carrier with a predetermined frequency interval, the radio communication terminal needs to increase the transmission power of the first carrier to maintain communications with the first radio base station using the first carrier. In addition, as the radio communication terminal comes closer to the second radio base station, the radio communication terminal reduces the transmission power of the second carrier.

In this way, in some cases, the radio communication terminal may not be able to maintain the transmission power difference within the predetermined threshold to continue communications currently being performed with the first radio base station and the second radio base station.

Hence, the present invention was made in light of such the circumstances, and an objective of the present invention is to provide a radio communication method and a radio communication terminal that are capable of maintaining communications by multicarrier, while controlling interference between adjacent carriers which are adjacent to each other with a predetermined frequency interval.

One characteristic of the present invention is summarized is as a radio communication method in reverse link by multicarrier using at least a first carrier and a second carrier that is adjacent to the first carrier with a predetermined frequency interval, the method including the steps of: calculating a transmission power difference between a transmission power value of the first carrier and a transmission power value of the second carrier; determining whether the transmission power difference exceeds a threshold set on the basis of a maximum transmission power difference allowable between the first carrier and the second carrier; and stopping a transmission of reverse link data using one of the first carrier and the second carrier with a larger transmission power value for a certain period in a case where the transmission power difference exceeds the threshold set on the basis of the maximum transmission power difference.

According to the aforementioned characteristic, in a case where a transmission power difference exceeds a threshold set on the basis of a maximum transmission power difference, transmission of reverse link data by using one of the first carrier and the second carrier that has a larger transmission power is stopped for a certain period. Thus, communications by multicarrier can be maintained while interference between adjacent carriers that are adjacent to each other with a predetermined frequency interval is controlled.

One characteristic of the present invention is summarized in that, in the aforementioned characteristic, the transmission power difference is calculated in a predetermined cycle in the step of calculating the transmission power difference. Moreover, in the aforementioned characteristic, the method further includes the step of determining whether the transmission power difference is increasing, on the basis of the transmission power differences calculated in the predetermined cycle, and in the step of stopping the transmission of the reverse link data, the transmission of reverse link data using one of the first carrier and the second carrier with a larger transmission power value is stopped for a certain period in a case where the transmission power difference is determined as increasing.

One characteristic of the present invention is summarized as a radio communication terminal performing communications by multicarrier using at least a first carrier and a second carrier that is adjacent to the first carrier with a predetermined frequency interval, the radio communication terminal including: a transmission power difference calculator (transmission power difference calculator 22) configured to calculate a transmission power difference between a transmission power value of the first carrier and a transmission power value of the second carrier; a transmission power determination unit (transmission power difference calculator 22) configured to determine whether the s transmission power difference calculated by the transmission power difference calculator exceeds a threshold set on the basis of a maximum transmission power difference allowable between the first carrier and the second carrier; and a communication controller (communication controller 23) configured to stop a transmission of reverse link data using one of the first carrier and the second carrier with a larger transmission power for a certain period in a case where the transmission power difference determination unit determines that the transmission power difference exceeds the threshold set on the basis of the maximum transmission power difference.

One characteristic of the present invention is summarized in that, in the aforementioned characteristic, the transmission power difference calculator calculates the transmission power difference in a predetermined cycle. Moreover, in the aforementioned characteristic, the radio communication terminal further includes a power difference tendency determination unit (transmission power difference determination unit 25) configured to determine whether the transmission power difference is increasing, on the basis of the transmission power differences calculated by the transmission power difference calculator in the predetermined cycle, and the communication controller stops the transmission of the reverse link data using one of the first carrier and the second carrier with a larger transmission power for a certain period in a case where the power difference tendency determination unit determines that the transmission power difference is increasing.

According to the characteristics of the present invention, it is possible to provide a radio communication method and a radio communication terminal capable of maintaining communications by multicarrier while controlling interference between adjacent carriers that are adjacent to each other with a predetermined frequency interval.

BRIEF DESCRIPTION OF THE DRAWINGS

FIG. 5 is a diagram showing a reverse link data transmission method according to the first embodiment of the present invention.

FIG. 12 is a diagram showing a reverse link data transmission method according to the third embodiment of the present invention.

BEST MODE FOR CARRYING OUT THE INVENTION

Figure 1:
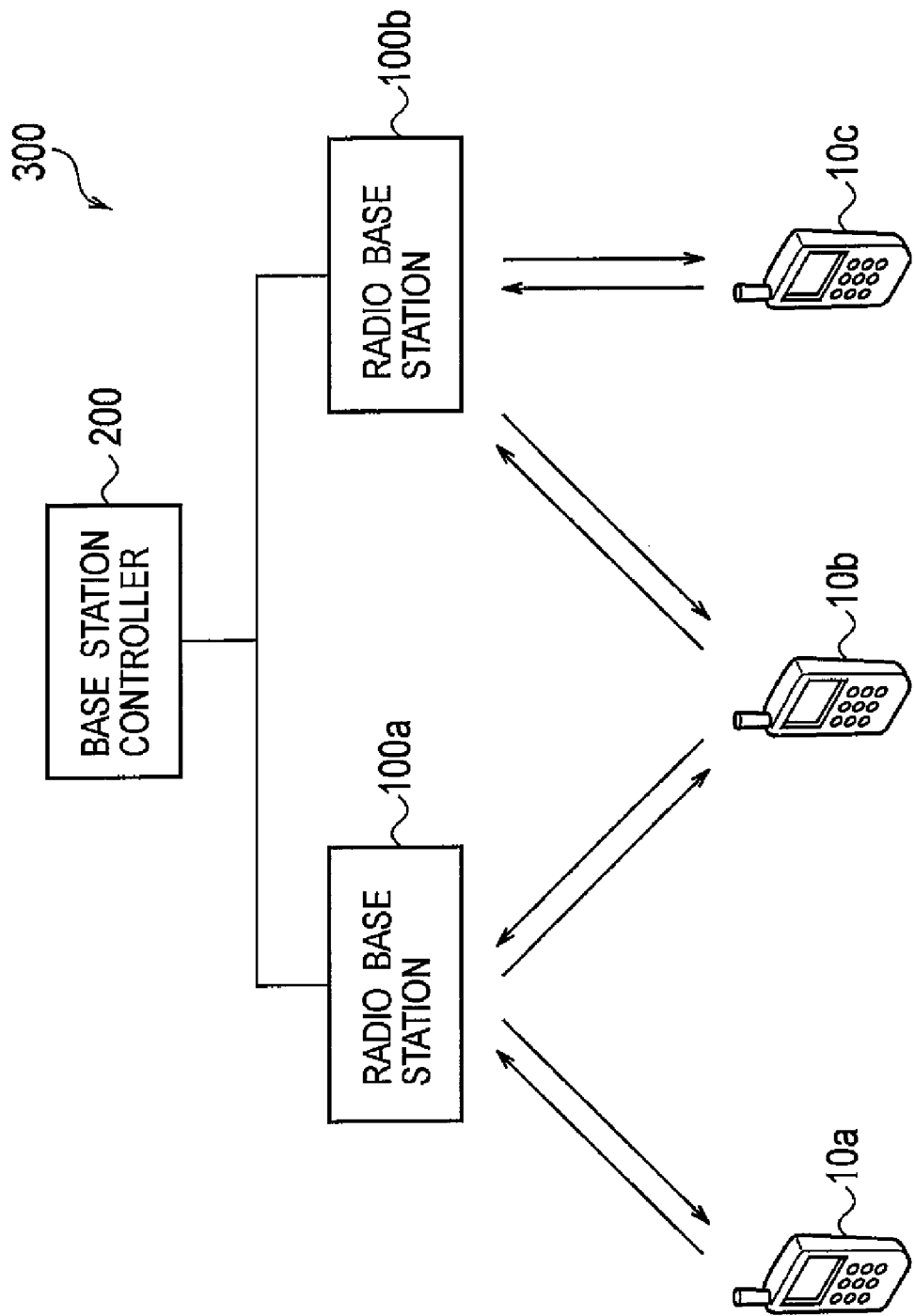
FIG. 1 is a diagram showing an overall schematic configuration of a communication system 300 according to a first embodiment of the present embodiment.

Next, embodiments of the present invention will be described. In the following description of the drawings, a same or similar reference numeral is given to a same or similar part. However, it should be noted that the drawings are schematic and the ratio of each dimension differs from actual ratio.

Thus, specific dimensions and the like are to be determined by referring to the following description. In addition, a relationship or a ratio of mutual dimensions may differ among the drawings, as a matter of course.

[First Embodiment]
(Overall Schematic Configuration of Communication System)

An overall schematic configuration of a communication system according to a first embodiment of the present embodiment will be described hereinafter with reference to the drawings. FIG. 1 shows an overall schematic configuration of a communication system 300 according to the first embodiment of the present embodiment.

As shown in FIG. 1, the communication system 300 includes multiple radio communication terminals 10 (a radio communication terminal 10*a* to a radio communication terminal 10*c*), multiple radio base stations 100 (a radio base station 100*a* and a radio base station 100*b*), and a base station controller 200.

A radio communication terminal 10 transmits reverse link data to a radio base station 100 by using a reverse link frequency band assigned for transmitting the reverse link data. Specifically, the reverse link frequency band is divided into multiple carriers. The radio communication terminal 10 transmits the reverse link data to the base radio station 100 by using the multiple carriers bundled in an upper layer (multicarrier).

In addition, a radio communication terminal 10 receives forward link data from a radio base station 100 by using a forward link frequency band assigned for transmitting the forward link data. Specifically, the forward link frequency band is divided into multiple carriers. The radio communication terminal 10 receives the forward link data from the radio base station 100 by using the multiple carriers bundled in an upper layer (multicarrier).

Note that, as in the case of the radio communication terminal 10*a* or the radio communication terminal 10*c*, the radio communication terminal 10 may communicate with a single radio base station 100. In addition, the radio communication terminal 10 may communicate with multiple radio base stations 100 as in the case of the radio communication terminal 10*b*.

The radio base station 100 receives the reverse link data from the radio communication terminal 10 by using the reverse link frequency band assigned for transmitting the reverse link data. The radio base station 100 also transmits the forward link data to the radio communication terminals 10 by using the forward link frequency band assigned for transmitting the forward link data.

The base station controller 200 controls communications made between the radio communication terminals 10 and the radio base stations 100. The base station controller 200 performs operation such as handoff in which the radio communication terminal 10 switches a radio base station 100 for communicating therewith to another.

Note that, in the communication system 300, the radio communication terminal 10 performs open loop control for controlling transmission power of reverse link data on the basis of reception power of forward link data received from the radio base station 100. The radio communication terminal 10 also performs closed loop control for controlling transmission power of reverse link data on the basis of power control information received from the radio base station 100. The power control information herein is information that the radio base station 100 generates on the basis of reception quality (for example, signal to interference ratio (SIR)) of the reverse link data received from the radio communication terminal 10.

(Reverse Link Frequency Band)

Figure 2:
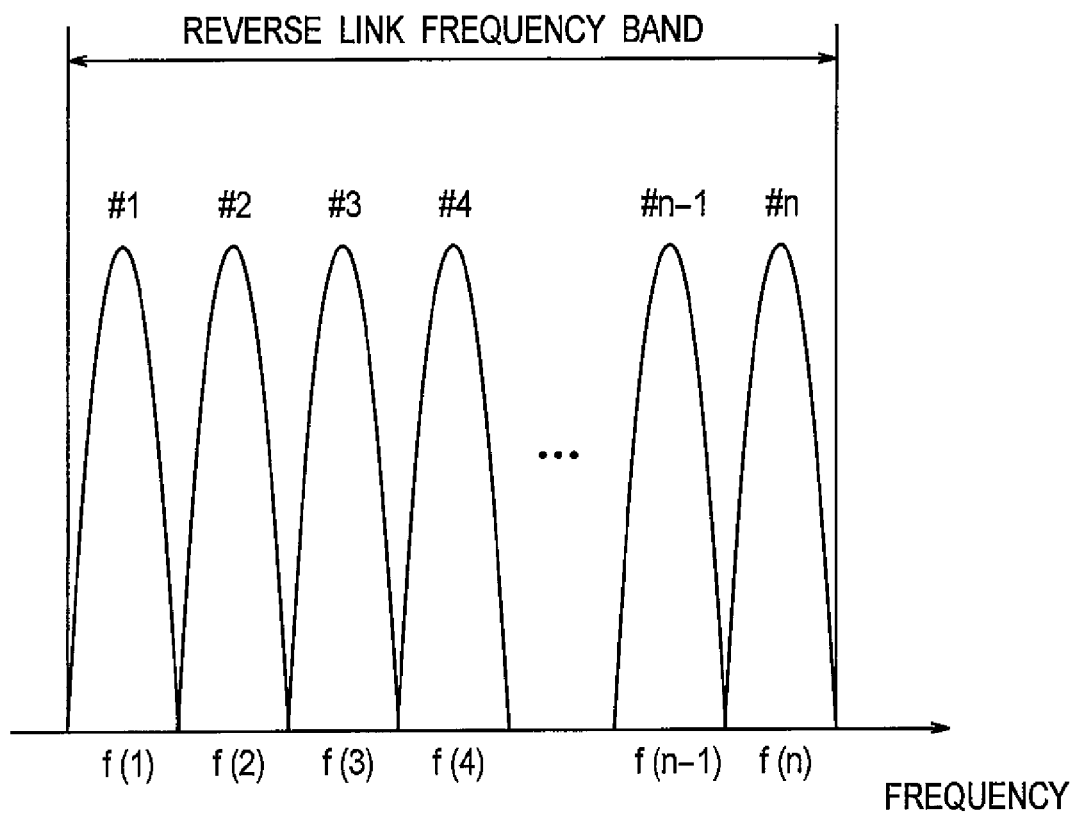
FIG. 2 is a diagram showing a reverse link frequency band according to the first embodiment of the present invention.

A reverse link frequency band according to the first embodiment of the present invention will be described hereinafter with reference to the drawings. FIG. 2 shows the reverse link frequency band according to the first embodiment of the present invention.

As shown in FIG. 2, the reverse link frequency band is divided into multiple carriers (carrier #1 to carrier #n). In addition, center frequencies of carriers are f(1) to f(n) respectively. The center frequencies of the respective carriers are adjacent to each other being spaced apart at a predetermined frequency interval (e.g., 1.25 MHz). Two carriers having their center frequencies being adjacent to each other will be hereinafter referred to as adjacent carriers.

(Configuration of Radio Communication Terminals)

Figure 3:
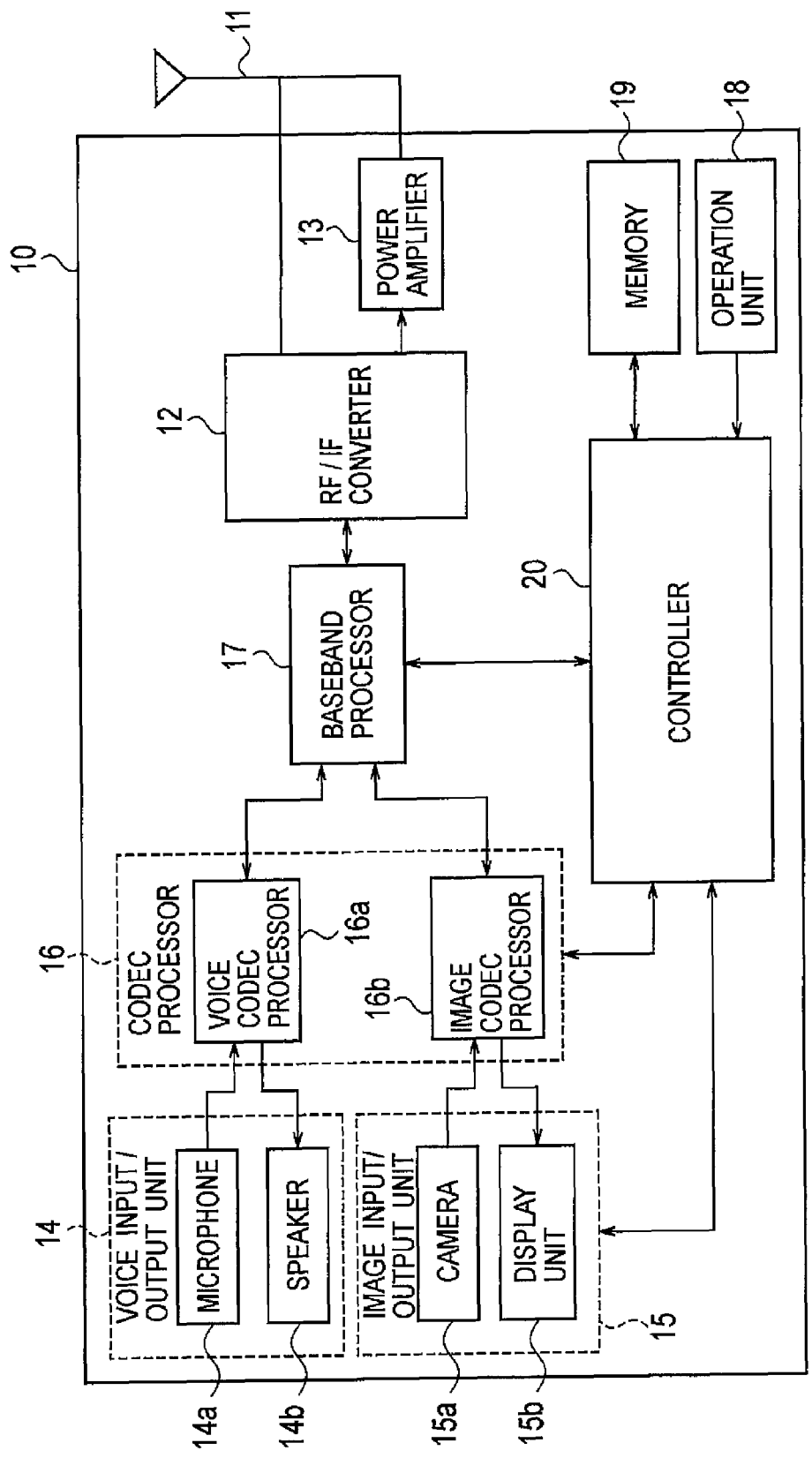
FIG. 3 is a block configuration diagram of a radio communication terminal 10 according to the first embodiment of the present invention.

A configuration of the radio communication terminal according to the first embodiment of the present invention will be described hereinafter with reference to the drawings. FIG. 3 is a block configuration diagram showing the radio communication terminal 10 according to the first embodiment of the present invention. Since the radio communication terminals 10a to 10c have similar configurations, they will be collectively referred to as a radio communication terminal 10 in the following description.

As shown in FIG. 3, the radio communication terminal 10 includes an antenna 11, an RF/IF converter 12, a power amplifier 13, a voice input/output unit 14, an image input/output unit 15, a codec processor 16, a baseband processor 17, an operation unit 18, a memory 19 and a controller 20.

The antenna 11 receives a signal (a reception signal) transmitted by the radio base stations 100. The antenna 11 also transmits a signal (a transmission signal) to the radio base stations 100.

The RF/IF converter 12 converts a frequency (Radio Frequency (RF)) of a reception signal received by the antenna 11 into a frequency (Intermediate Frequency (IF)) to be processed by the baseband processor 17. The RF/IF converter 12 also converts the frequency (IF) of a transmission signal acquired from the baseband processor 17 into the frequency (RF) to be used in radio communications. In addition, the RF/IF converter 12 inputs the transmission signal converted into the radio frequency (RF) to the power amplifier 13.

The power amplifier 13 amplifies the transmission signal acquired from the RF/IF converter 12. The amplified transmission signal is inputted to the antenna 11.

The voice input/output unit 14 has a microphone 14a for collecting voice and a speaker 14b for outputting voice. The microphone 14a inputs a voice signal into the codec processor 16 on the basis of the collected voice. The speaker 14b outputs voice on the basis of the voice signal acquired from the codec processor 16.

The image input/output unit 15 includes a camera 15a for capturing an object, and a display unit 15b for displaying characters or images, etc. The camera 15a inputs an image signal to the codec processor 16 on the basis of captured images (still images and moving images). The display unit 15b displays images on the basis of the image signal acquired from the codec processor 16. The display unit 15b also displays characters inputted through the operation unit 18.

The codec processor 16 includes: a voice codec processor 16a for encoding and decoding a voice signal according to a predetermined encoding scheme (EVRC (Enhanced Variable Rate Codec), AMR (Advanced Multi Rate Codec) or G.729 compliant with ITU-T, for example); and an image codec processor 16b for encoding and decoding an image signal according to a predetermined encoding scheme (MPEG-4 etc, for example).

The voice codec processor 16a encodes a voice signal acquired from the voice input/output unit 14. The voice codec processor 16a also decodes a voice signal acquired from the baseband processor 17. The image codec processor 16b encodes an image signal acquired from the image input/output unit 15, and also decodes an image signal acquired from the baseband processor 17.

The baseband processor 17 modulates a transmission signal or demodulates a reception signal according to a predetermined modulation scheme (QPSK or 16 QAM), or the like. Specifically, the baseband processor 17 modulates a baseband signal such as a voice signal or an image signal acquired from the codec processor 16. The modulated baseband signal (transmission signal) is inputted into the RF/IF converter 12. The baseband processor 17 also demodulates a reception signal acquired from the RF/IF converter 12. The demodulated reception signal (baseband signal) is inputted into the codec processor 16.

The baseband processor 17 modulates information generated by the controller 20. The modulated information (transmission signal) is inputted into the RF/IF converter 12. The baseband processor 17 also demodulates a reception signal acquired from the RF/IF converter 12. The demodulated reception signal is inputted into the controller 20.

The operation unit 18 includes a group of keys consisting of input keys for allowing characters, digits, or the like to be inputted, a response key for responding to incoming communications (receiving a call), or a calling key for calling (originating a call), etc. In addition, when each key is pressed, the operation unit 18 allows an input signal corresponding to the pressed key to be inputted to the controller 20.

The memory 19 stores a program for controlling operation of the radio communication terminal 10, various types of data such as history of originated/received calls, an address book, etc. The memory 19 is formed of a flash memory that is a nonvolatile semiconductor memory, or an SRAM (Static Random Access Memory) that is a volatile semiconductor memory, etc.

The controller 20 controls operation of the radio communication terminal 10 (the image input/output unit 15, the codec processor 16, the baseband processor 17, etc.) according to the program stored in the memory 19.

Figure 4:
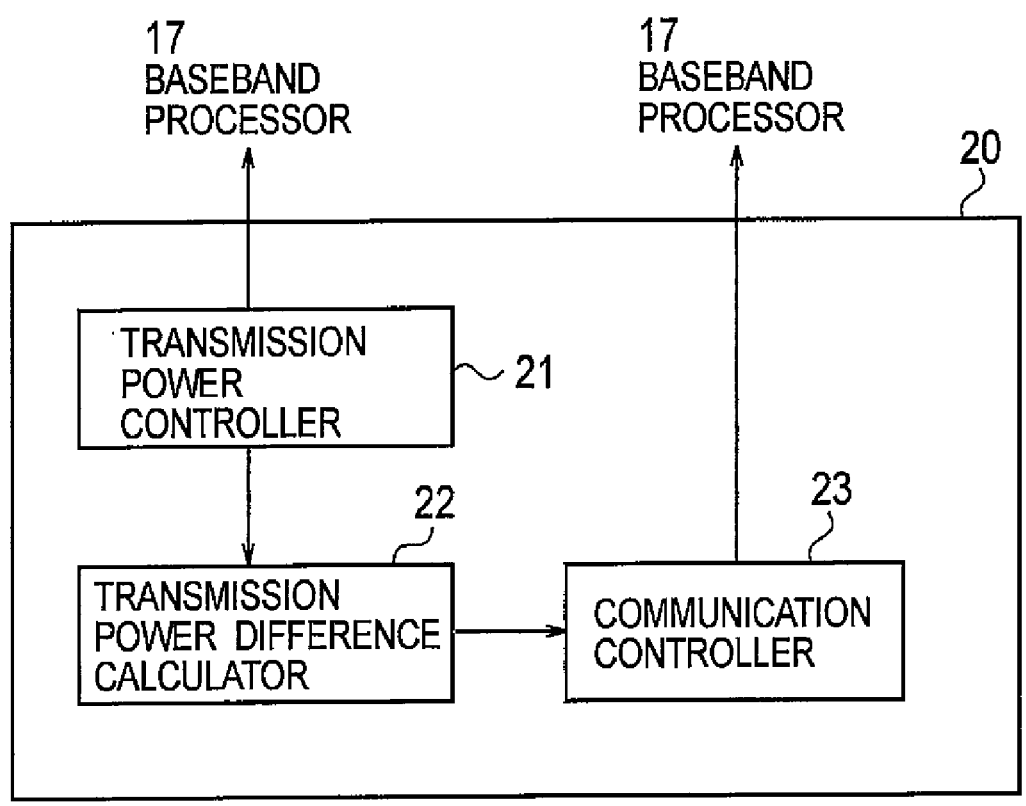
FIG. 4 is a functional block configuration diagram of a controller 20 according to the first embodiment of the present invention.

Hereinafter, a configuration of a controller according to the first embodiment of the present invention will be described with reference to the drawings. FIG. 4 is a functional block configuration diagram showing the controller 20 according to the first embodiment of the present invention.

As shown in FIG. 4, the controller 20 includes a transmission power controller 21, a transmission power difference calculator 22 and a communication controller 23.

The transmission power controller 21 controls a transmission power of reverse link data for each carrier. Specifically, the transmission power controller 21 controls the transmission power of the reverse link data on the basis of reception quality (SIR, for example) of forward link data received from the radio base station 100 to which the reverse link data is transmitted (open loop control).

The transmission power controller 21 also controls a transmission power of reverse link data on the basis of power control information received from the radio base station 100 to which reverse link data is transmitted (closed loop control). Note that, as described above, the power control information is information that the radio base station 100 generates on the basis of reception quality (SIR, for example) of the reverse link data. The power control information requests an increase or decrease of the transmission power for the reverse link data.

The transmission power difference calculator 22 calculates a difference between transmission powers of adjacent carriers for reverse link data (hereinafter, a transmission power difference). Moreover, the transmission power difference calculator 22 determines whether or not the transmission power difference between the adjacent carriers exceeds a threshold set on the basis of a maximum transmission power difference (MaxRLTxPwrDiff) allowable between the adjacent carriers. Note that, when the transmission power difference between the adjacent carriers exceeds the threshold set on the basis of the maximum transmission power difference, the transmission power difference calculator 22 informs the communication controller 23 that the transmission power difference between the adjacent carriers has exceeded the threshold set on the basis of the maximum transmission power difference.

Here, the threshold to be set on the basis of a maximum transmission power difference may be equal to the maximum transmission power difference itself or may be a value smaller than the maximum transmission power difference (such as a value obtained by multiplying the maximum transmission power difference by a predetermined ratio (0.9)).

The communication controller 23 sets a reverse link data transmission method on the basis of the transmission power difference between the adjacent carriers, and transmits reverse link data in accordance with the set transmission method. Here, the reverse link data transmission method includes a normal transmission and an intermittent transmission. In the normal transmission, reverse link data using adjacent carriers is multiplexed and then transmitted. In the intermittent transmission, reverse link data using adjacent carriers is transmitted in a manner that transmissions of the reverse link data do not overlap with each other on the time axis.

Specifically, when informed that a transmission power difference between adjacent carriers exceeds a threshold set on the basis of a maximum transmission power difference, the communication controller 23 sets the intermittent transmission for the transmission method for the reverse link data using the adjacent carriers. In the intermittent transmission, the reverse link data is transmitted in a manner that the transmissions of the reverse link data using the adjacent carriers do not overlap with each other on the time axis.

Hereinafter, the reverse link data transmission method will be described in detail with reference to the drawings. FIGS. 5 show the reverse link data transmission method according to the first embodiment of the present invention.

Note that FIG. 5(a) shows a reverse link data transmission method (normal transmission) used when a transmission power difference between adjacent carriers does not exceed a threshold set on the basis of a maximum transmission power difference. On the other hand, FIG. 5(b) shows a reverse link data transmission method (intermittent transmission) used when a transmission power difference between adjacent carriers exceeds a threshold set on the basis of a maximum transmission power difference.

Here, it should be noted that the description of FIGS. 5(a) and (b) will be given while citing the carrier #1 and the carrier #2 as the adjacent carriers, for example.

As shown in FIG. 5(a), when a transmission power difference between adjacent carriers does not exceed a threshold set on the basis of a maximum transmission power difference, reverse link data using the carrier #1 and reverse link data using the carrier #2 are multiplexed and transmitted. Specifically, in the normal transmission, reverse link data using the carrier #1 and reverse link data using the carrier #2 are transmitted by use of time frames overlapping with each other on the time axis.

On the other hand, as shown in FIG. 5(b), when a transmission power difference between adjacent carriers exceeds a threshold set on the basis of a maximum transmission power difference, reverse link data using the carrier #1 and reverse link data using the carrier #2 are transmitted so as not to overlap each other on the time axis. Specifically, in the intermittent transmission, reverse link data using the carrier #1 and reverse link data using the carrier #2 are transmitted by use of time frames divided in a manner that the transmissions of the reverse link data do not overlap with each other on the time axis.

(Operation of Radio Communication Terminal)

Figure 6:
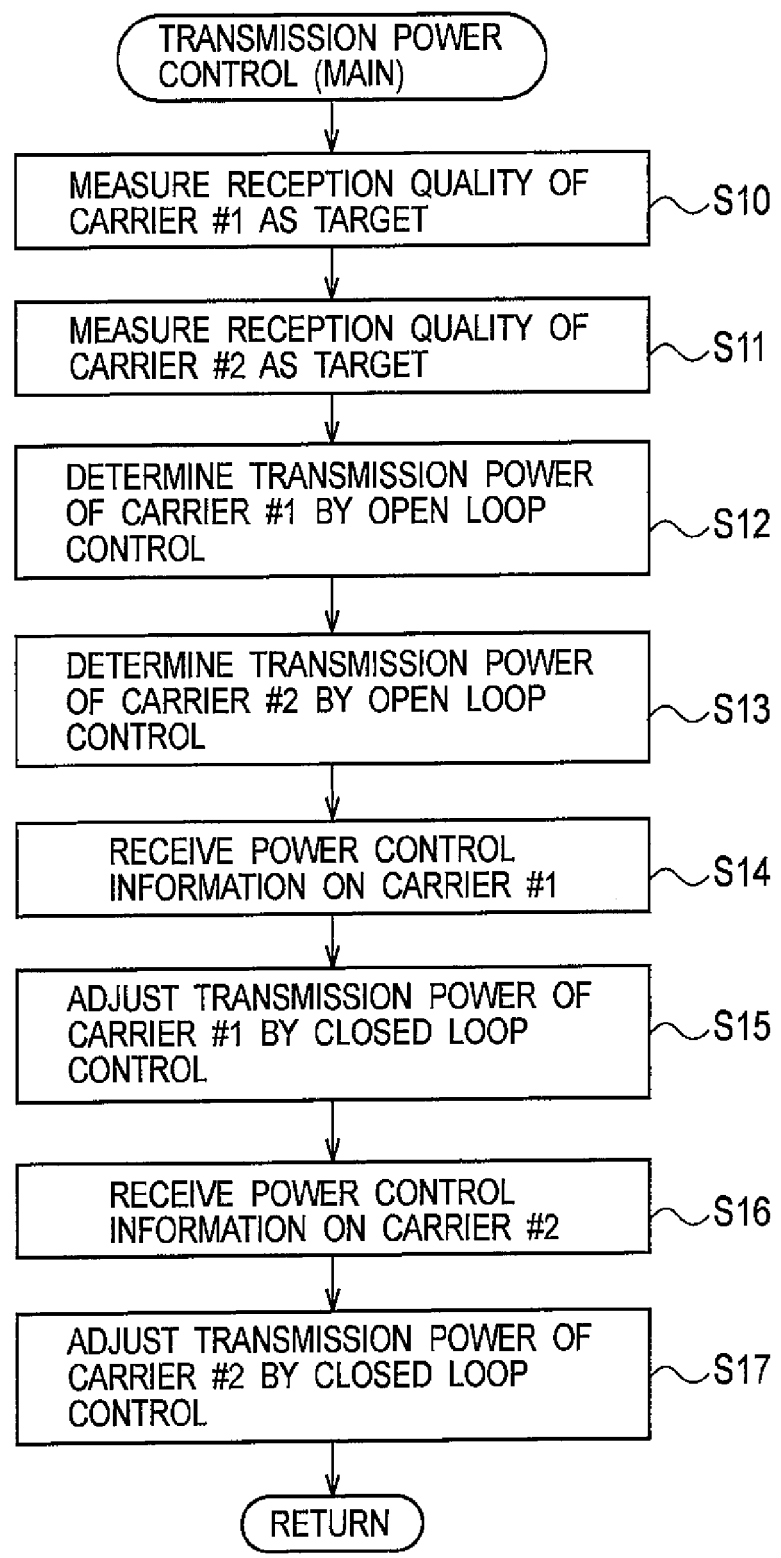
FIG. 6 is a flowchart showing operation of the radio communication terminal 10 according to the first embodiment of the present invention (Part 1).
Figure 7:
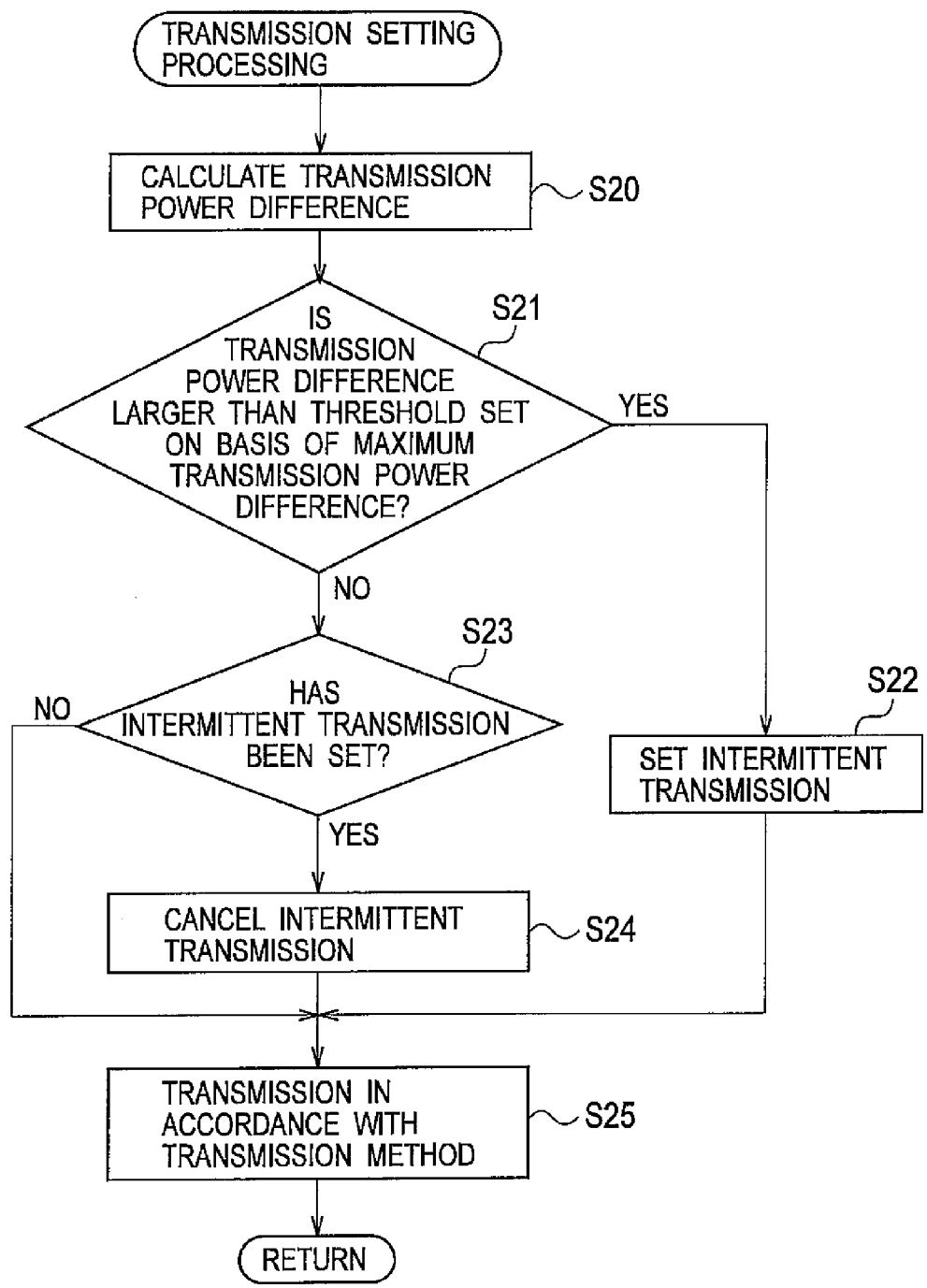
FIG. 7 is a flowchart showing operation of the radio communication terminal 10 according to the first embodiment of the present invention (Part 2).

The operation of the radio communication terminal according to the first embodiment of the present invention will be described hereinafter with reference to the drawings. FIGS. 6 and 7 are flowcharts of the operation of the radio communication terminal 10 according to the first embodiment of the present invention.

Note that, hereinafter, the description will be given while citing a case where the adjacent carriers are the carrier #1 and the carrier #2 as an example. In addition, an assumption is made that the radio communication terminal 10 transmits reverse link data to the radio base station 100a by using the carrier #1, and transmits reverse link data to the radio base station 100b by using the carrier #2.

Firstly, a description will be given of main processing of transmission power control with reference to FIG. 6. Note that, the main processing of controlling a transmission power is repeatedly performed in a predetermined cycle.

As shown in FIG. 6, in step 10, the radio communication terminal 10 measures reception quality of forward link data as the carrier #1 being the target. Specifically, the radio communication terminal 10 measures the reception quality of forward link data received from the radio base station 100a to which reverse link data is to be transmitted by using the carrier #1.

In step 11, the radio communication terminal 10 measures reception quality of forward link data as the carrier #2 being the target. Specifically, the radio communication terminal 10 measures the reception quality of forward link data received from the radio base station 100b to which reverse link data is to be transmitted by using the carrier #2.

In step 12, the radio communication terminal 10 determines a transmission power of the reverse link data to be transmitted by using the carrier #1, through the open loop control. Specifically, the radio communication terminal 10 determines the transmission power of the reverse link data to be transmitted by using the carrier #1, on the basis of the reception quality measured in step 10.

In step 13, the radio communication terminal 10 determines a transmission power of the reverse link data to be transmitted by using the carrier #2, through the open loop control. Specifically, the radio communication terminal 10 determines the transmission power of the reverse link data to be transmitted by using the carrier #2, on the basis of the reception quality measured in step 11.

In step 14, the radio communication terminal 10 receives power control information for the carrier #1. Specifically, the radio communication terminal 10 receives the power control information from the radio base station 100a to which reverse link data is transmitted by using the carrier #1. Note that the power control information is information that the radio base station 100a generates on the basis of the reception quality of the reverse link data transmitted by using the carrier #1.

In step 15, the radio communication terminal 10 adjusts the transmission power of the reverse link data to be transmitted by using the carrier #1, through the closed loop control. Specifically, the radio communication terminal 10 adjusts the transmission power of the reverse link data determined in step 12, on the basis of the power control information received in step 14.

Specifically, the radio communication terminal 10 transmits the reverse link data by using the carrier #1 with the transmission power determined through the open loop control and the closed loop control.

In step 16, the radio communication terminal 10 receives power control information for the carrier #2. Specifically, the radio communication terminal 10 receives the power control information from the radio base station 100b to which reverse link data is transmitted by using the carrier #2. Note that the power control information is information that the radio base station 100b generates on the basis of the reception quality of the reverse link data transmitted by using the carrier #2.

In step 17, the radio communication terminal 10 adjusts the transmission power of the reverse link data to be transmitted by using the carrier #2, through the closed loop control. Specifically, the radio communication terminal 10 adjusts the transmission power of the reverse link data determined in step 13, on the basis of the power control information received in step 16.

Specifically, the radio communication terminal 10 transmits the reverse link data by using the carrier #2 with the transmission power determined through the open loop control and the closed loop control.

Next, transmission setting processing for setting the reverse link data transmission method will be described with reference to FIG. 7. Note that the transmission setting processing interrupts the main processing of the transmission power control in a predetermined cycle.

As shown in FIG. 7, in step 20, the radio communication terminal 10 calculates a difference between the transmission powers of the adjacent carriers (the carrier #1 and the carrier #2) for the reverse link data (transmission power difference).

In step 21, the radio communication terminal 10 determines whether or not the transmission power difference between the adjacent carriers exceeds a threshold that is set on the basis of a maximum transmission power difference (MaxRLTxPwrDiff). The radio communication terminal 10 proceeds to the processing of step 22 when the transmission power difference between the adjacent carriers exceeds the threshold set on the basis of the maximum transmission power difference. On the other hand, when the transmission power difference between the adjacent carriers does not exceed the threshold set on the basis of the maximum transmission power difference, the radio communication terminal 10 moves to the processing of step 23.

Here, the threshold to be set on the basis of a maximum transmission power difference may be equal to the maximum transmission power difference itself, or may be a value smaller than the maximum transmission power difference (such as a value obtained by multiplying the maximum transmission power difference by a predetermined ratio (0.9)), as described above.

In step 22, the radio communication terminal 10 sets the intermittent transmission as the transmission method. In the intermittent transmission, reverse link data using adjacent carriers is transmitted by use of time frames divided in a manner that transmissions of the reverse link data using the adjacent carriers do not overlap with each other on the time axis.

In step 23, the radio communication terminal 10 determines whether or not the intermittent transmission has been set as the reverse link data transmission method. In a case where the intermittent transmission has been set as the reverse link data transmission method, the radio communication terminal 10 moves to the processing of step 24. Furthermore, in a case where the intermittent transmission has not been set as the reverse link data transmission method, the radio communication terminal 10 moves to the processing of step 25.

In step 24, the radio communication terminal 10 cancels the intermittent transmission and sets the normal transmission as the reveres link data transmission method.

In step 25, the radio communication terminal 10 transmits reverse link data in accordance with the set transmission method.

(Action and Effect)

With the radio communication terminal 10 according to the first embodiment of the present invention, in a case where a transmission power difference between adjacent carriers exceeds a threshold set on the basis of a maximum transmission power difference (MaxRLTxPwrDiff), the communication controller 23 transmits the reverse link data using the adjacent carriers by use of the intermittent transmission (in other words, the reverse link data using the adjacent carriers is transmitted in a manner that transmissions of the reverse link data do not overlap with each other).

Thus, communications by multicarrier can be maintained while interference between adjacent carriers which are adjacent to each other with a predetermined frequency interval is controlled.

[Second Embodiment]

A second embodiment of the present invention will be described hereinafter. In the following description, differences between the first embodiment described above and the second embodiment will be mainly described.

Specifically, in the aforementioned first embodiment, the radio communication terminal 10 sets an intermittent transmission as the reverse link data transmission method in a case where a transmission power difference between adjacent carriers exceeds a threshold set on the basis of a maximum transmission power difference.

Different from this, in the second embodiment, the radio communication terminal 10 determines whether or not a transmission power difference between adjacent carriers is increasing. Then, the radio communication terminal 10 sets the intermittent transmission as the reverse link data transmission method in a case where the transmission power difference between the adjacent carriers is increasing, and also where the transmission power difference between the adjacent carriers exceeds a threshold set on the basis of a maximum transmission power difference.

(Configuration of Radio Communication Terminal)

Figure 8:
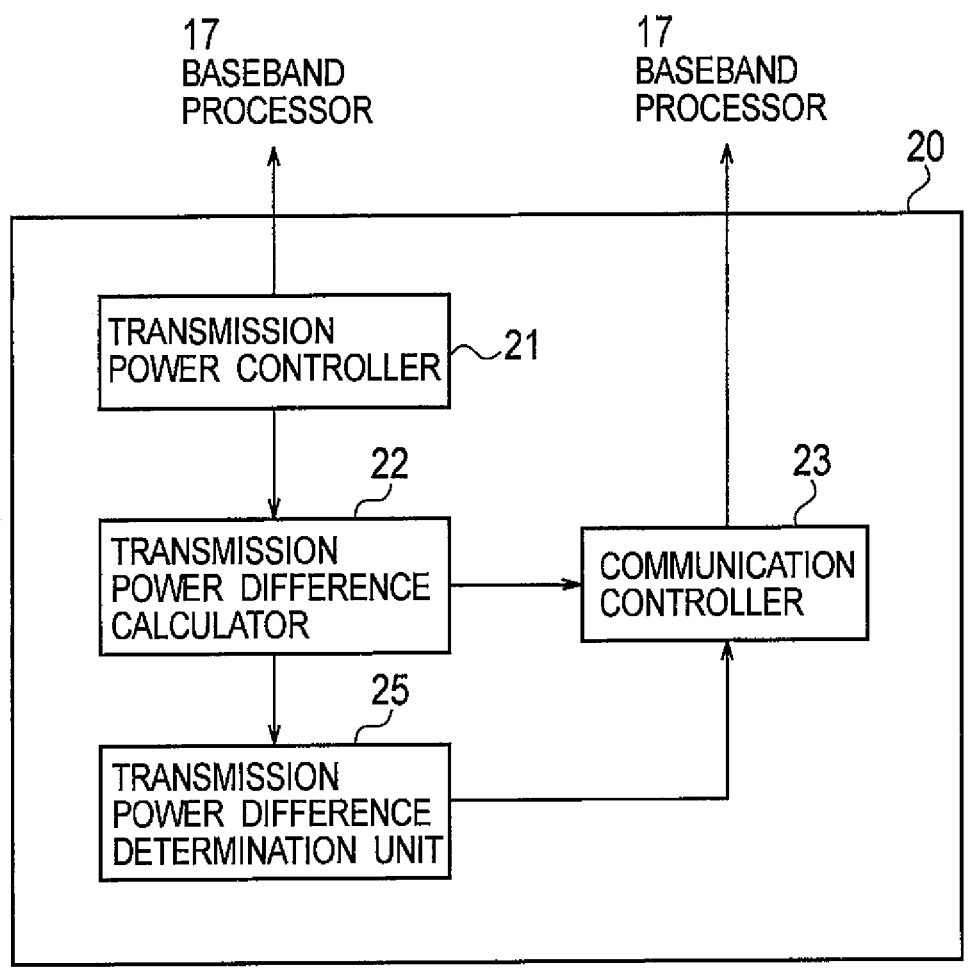
FIG. 8 is a functional block configuration diagram of a controller 20 according to a second embodiment of the present invention.

A configuration of a radio communication terminal according to the second embodiment of the present invention will be described hereinafter with reference to the drawings. FIG. 8 is a functional block configuration diagram showing the controller 20 of the radio communication terminal 10 according to the second embodiment of the present invention. It should be noted that in FIG. 8, similar reference numerals are assigned to the configuration similar to FIG. 4.

As shown in FIG. 8, the radio communication terminal 10 includes a transmission power difference determination unit

25 in addition to the transmission power controller 21, the transmission power difference calculator 22 and the communication controller 23.

The transmission power difference calculator 22 calculates a transmission power difference between adjacent carriers in a predetermined cycle (cycle in which the transmission power controller 21 performs transmission power control, for example).

The transmission power difference determination unit 25 determines whether or not the transmission power difference between the adjacent carriers is increasing, the difference calculated by the transmission power difference calculator 22 in the predetermined cycle. Specifically, on the basis of the transmission power of the reverse link data, the transmission power difference determination unit 25 calculates an expression of an estimated curve (hereinafter referred to as an estimated curve expression) for each of the adjacent carriers, the estimated curve expression showing a state in which the transmission power of the reverse link data changes on the time axis. Subsequently, the transmission power difference determination unit 25 determines whether or not the difference in values calculated by each of the estimated curve expressions (hereinafter referred to as an estimated curve difference) at a predetermined time exceeds an estimated curve difference threshold for a predetermined period. When the estimated curve difference between the adjacent carriers exceeds the estimated curve threshold for the predetermined period, the transmission power difference determination unit 25 informs the communication controller 23 that the estimated curve difference between the adjacent carriers exceeds the estimated curve threshold for the predetermined period.

Figure 9:
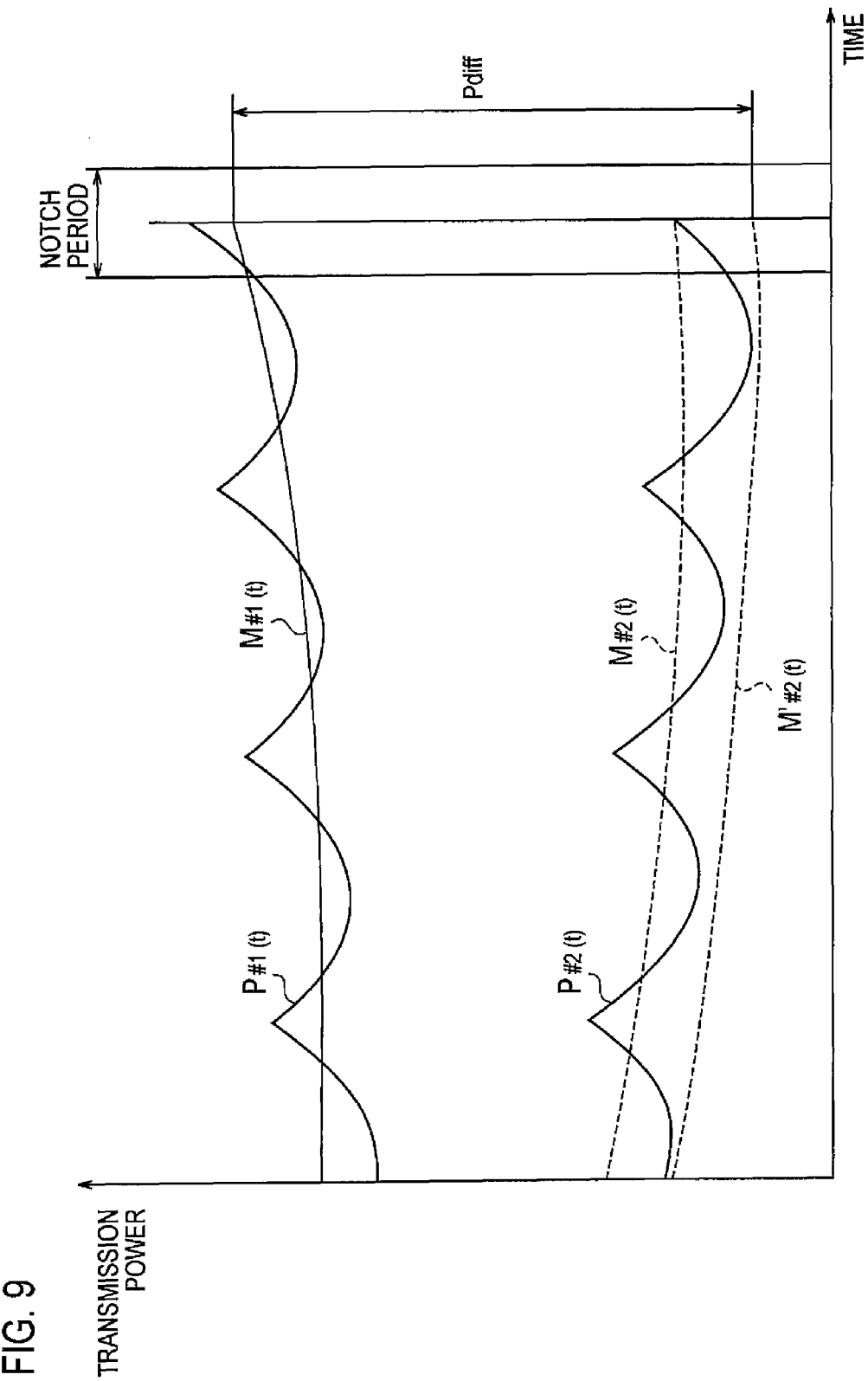
FIG. 9 is a diagram for describing calculation of an estimated curve difference (a difference in values calculated by an estimated curve expression of each carrier) according to the second embodiment of the present invention.

For example, using the case where the adjacent carriers are the carrier #1 and the carrier #2 as an example, the procedure for calculating an estimated curve difference between the carrier #1 and the carrier #2 will be described with reference to FIG. 9. Hereinafter, considered is the case where the transmission power of the carrier #1 is larger than that of the carrier #2.

Note that, a notch period is determined by notch intervals calculated on the basis of reception strength or reception quality (SIR). Specifically, the notch period includes a notch interval before the peak point of a transmission power estimation curve and a notch interval after the peak point thereof. Here, the radio communication terminal 10 sets the intermittent transmission as the reverse link data transmission method in a case where the estimated curve difference between the adjacent carriers exceeds the estimated curve threshold for the predetermined period during the notch period.

Specifically, when the transmission power of the carrier #1 at time t is set as "$P_{\#1}(t)$", an estimated curve expression "$M_{\#1}(t)$" of the carrier #1 is calculated by the following expression (1) where α is a coefficient corresponding to the carrier #1.

[Formula 1]

$$M_{\#1}(t)=\alpha \times P_{\#1}(t)+(1-\alpha) \times M_{\#1}(t-\Delta t) \quad \text{Expression (1)}$$

On the other hand, when the transmission power of the carrier #2 at the time t is set as "$P_{\#2}(t)$", an estimated curve expression "$M_{\#2}(t)$" of the carrier #2 is calculated by the following expression (2) where β is a coefficient corresponding to the carrier #2.

[Formula 2]

$$M_{\#2}(t)=\beta \times P_{\#2}(t)+(1-\beta) \times M_{\#2}(t-\Delta t) \quad \text{Expression (2)}$$

Furthermore, for the carrier #2 having a lower transmission power, a lower estimated curve expression "$M'_{\#2}(t)$" of the carrier #2 is calculated by the following expression (3).

[Formula 3]

$$M'_{\#2}(t)=M_{\#2}(t)-\max\{M_{\#2}(t+\Delta t)-P_{\#2}(t+\Delta t)\} \quad \text{Expression (3)}$$

In addition, at the time t, a difference (estimated curve difference "$P_{diff}$") between a value calculated by the estimated curve expression of the carrier #1 and a value calculated by the lower estimated curve expression of the carrier #2 is calculated by the following expression (4).

[Formula 4]

$$P_{diff}=M_{\#1}(t)-M'_{\#2}(t) \quad \text{Expression (4)}$$

Subsequently, the transmission power difference determination unit 160 determines whether or not the estimated curve difference "$P_{diff}$" calculated by the expression (1) to the expression (4) exceeds the estimated curve difference threshold ($P_{thresh}$) for a predetermined period.

It is needless to say that an estimated curve difference "$P_{diff}$" may simply be a difference between a value calculated by the estimated curve expression "$M_{\#1}(t)$" and a value calculated by the estimated curve expression "$M_{\#2}(t)$", not a difference between a value calculated by the estimated curve expression "$M_{\#1}(t)$" and a value calculated by the lower estimated curve expression "$M'_{\#2}(t)$".

Note that the transmission power difference determination unit 25 may determine whether or not the estimated curve difference "$P_{diff}$" exceeds the estimated curve difference threshold ($P_{thresh}$) during the notch period.

When informed that an estimated curve difference between adjacent carriers exceeds an estimated curve threshold for a predetermined period and that a transmission power difference between the adjacent carriers exceeds a threshold set on the basis of a maximum transmission power difference, the communication controller 23 sets the intermittent transmission as the reverse link data transmission method.

(Operation of Radio Communication Terminal)

Figure 10:
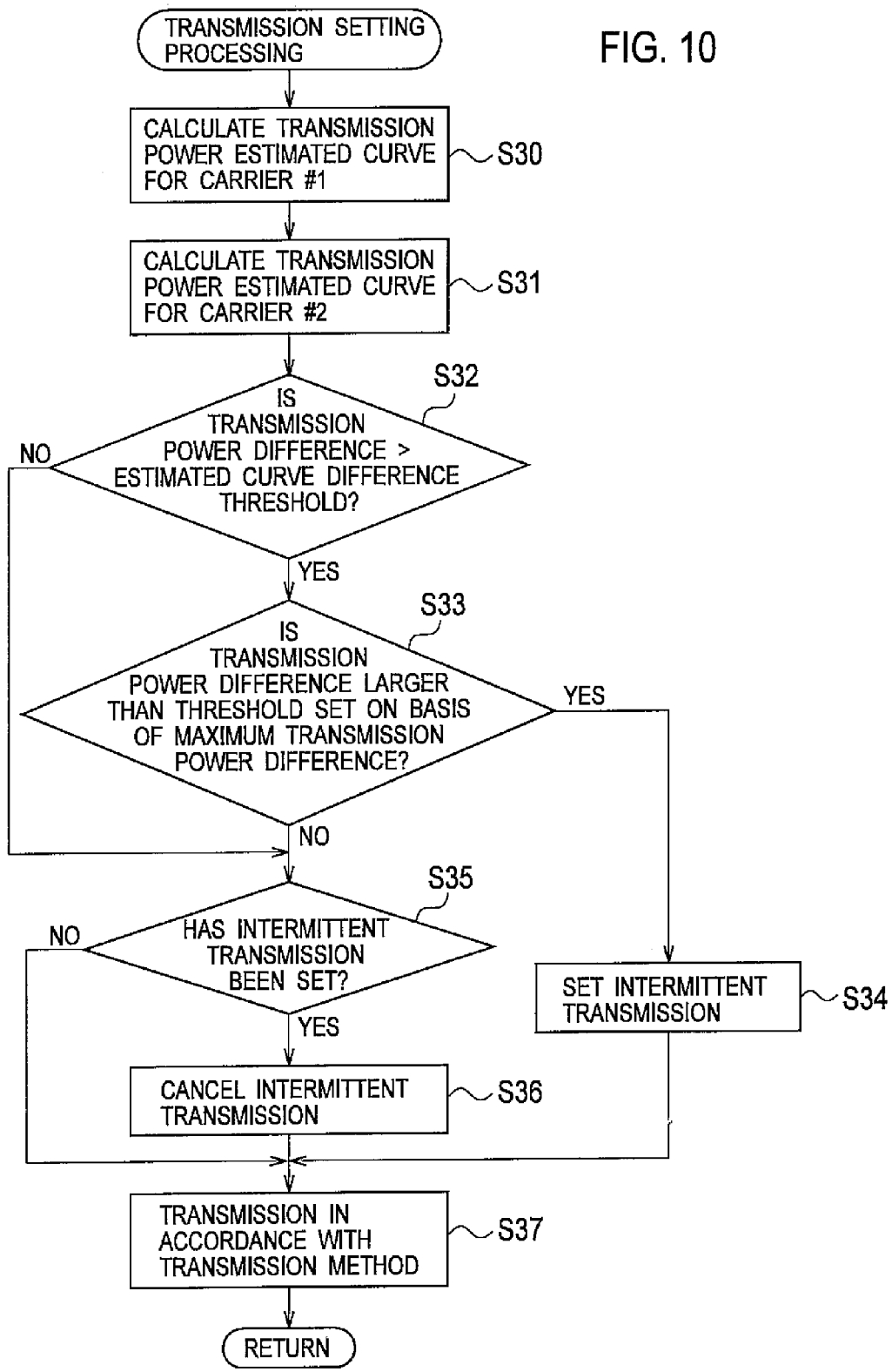
FIG. 10 is a flowchart showing operation of a radio communication terminal 10 according to the second embodiment of the present invention.

The operation of the radio communication terminal according to the second embodiment of the present invention will be described hereinafter with reference to the drawings. FIG. 10 is a flowchart of the operation of the radio communication terminal 10 according to the second embodiment of the present invention. Note that the transmission setting processing shown in FIG. 10 is performed instead of the aforementioned transmission setting processing shown in FIG. 7.

Hereinafter, as is the case of the first embodiment as described above, the description will be given while citing the case where the adjacent carriers are the carrier #1 and the carrier #2 as an example. In addition, an assumption is made that the radio communication terminal 10 transmits reverse link data to the radio base station 100a by using the carrier #1, and transmits reverse link data to the radio base station 100b by using the carrier #2. Furthermore, the transmission power of the carrier #1 is assumed to be larger than that of the carrier #2.

As shown in FIG. 10, in step 30, the radio communication terminal 10 calculates an estimated curve expression of the carrier #1 on the basis of a transmission power of reverse link data transmitted via the carrier #1 with larger transmission power.

In step 31, the radio communication terminal 10 calculates an estimated curve expression (or the lower estimated curve expression) of the carrier #2 on the basis of a transmission power of reverse link data transmitted via the carrier #2 with lower transmission power.

Instep 32, based on the estimated curve expression of the carrier #1 calculated in step 30 and the estimated curve expression (or the lower estimated curve expression) of the carrier #2 calculated in step 31, the radio communication terminal 10 determines whether or not a transmission power difference between the carrier #1 and the carrier #2 exceeds the estimated curve difference threshold. Specifically, the radio communication terminal 10 calculates a difference (estimated curve difference) between a value calculated by the estimated curve expression of the carrier #1 and a value calculated by the estimated curve expression (or the lower estimated curve expression) of the carrier #2. Subsequently, the radio communication terminal 10 determines whether or not the estimated curve difference exceeds an estimated curve difference threshold for a predetermined period.

When the radio communication terminal 10 determines that the estimated curve difference exceeds the estimated curve difference threshold for the predetermined period in step 32, the 33. On the other hand, when the radio communication terminal 10 determines that the estimated curve difference does not exceed the estimated curve difference threshold for the predetermined period in step 32, the radio communication terminal 10 proceeds to the processing of step 35.

In step 33, the radio communication terminal 10 determines whether or not the transmission power difference between the carrier #1 and the carrier #2 exceeds a threshold set on the basis of a maximum transmission power difference. When the radio communication terminal 10 determines that the transmission power difference exceeds the threshold set on the basis of the maximum transmission power difference in step 33, the radio communication terminal 10 proceeds to the processing of step 34. On the other hand, when the radio communication terminal 10 determines that the transmission power difference does not exceed the threshold set on the basis of the maximum transmission power difference in step 33, the radio communication terminal 10 moves to the processing of step 35.

In step 34, the radio communication terminal 10 sets the intermittent transmission as the reverse link data transmission method for the reverse link data using the adjacent carriers.

Instep 35, the radio communication terminal 10 determines whether or not the intermittent transmission has been set as the reverse link data transmission method. In a case where the intermittent transmission has been set as the reverse link data transmission method, the radio communication terminal 10 moves to the processing of step 36. On the other hand, in a case where the intermittent transmission has not been set as the reverse link data transmission method, the radio communication terminal 10 moves to the processing of step 37.

In step 36, the radio communication terminal 10 cancels the intermittent transmission and sets the normal transmission as the reverse link data transmission method.

In step 37, the radio communication terminal 10 transmits the reveres link data in accordance with the set transmission method.

(Action and Effect)

With the radio communication terminal 10 according to the second embodiment of the present invention, the communication controller 23 sets an intermittent transmission as a reverse link data transmission method not simply in a case where a transmission power difference between adjacent carriers exceeds a threshold set on the basis of a maximum transmission power difference, but in a case where the transmission power difference between the adjacent carriers exceeds an estimated curve difference threshold for a predetermined period of time (in other words, the transmission power difference between the adjacent carriers is increasing), and also where the transmission power difference between the adjacent carriers exceeds the threshold set on the basis of the maximum transmission power difference.

Here, there may be a case where a transmission power of the carrier temporarily increases through the open loop control or the closed loop control, as a result of deterioration of reception quality due to effect of fading or the like. In such a case, even if the transmission power difference between the adjacent carriers temporarily exceeds a threshold set on the basis of a maximum transmission power difference, the transmission power difference between the adjacent carriers is likely to fall within the maximum transmission power difference when the effect of fading or the like is eliminated.

In the second embodiment of the present invention, it is possible to prevent unnecessary intermittent transmission from being performed in the aforementioned case where a transmission power difference between adjacent carriers temporarily exceeds a threshold set on the basis of a maximum transmission power difference.

[Third Embodiment]

A third embodiment of the present invention will be described hereinafter. In the following description, differences between the aforementioned first embodiment and the third embodiment will be mainly described.

Specifically, in the first embodiment described above, the radio communication terminal 10 sets an intermittent transmission as a reverse link data transmission method in a case where a transmission power difference between adjacent carriers exceeds a threshold set on the basis of a maximum transmission power difference.

Different from this, in the third embodiment, the radio communication terminal 10 sets stop of transmission as a reverse link data transmission method in a case where a transmission power difference between adjacent carriers exceeds a threshold ($P_{th}$) set on the basis of a maximum transmission power difference. In the stop of transmission, a transmission of reverse link data by use of one of the adjacent carriers that has a larger transmission power is stopped for a certain period ($T_2-T_1$) until the transmission power difference between the adjacent carriers decreases to a value equal to or less than the threshold set on the basis of the maximum transmission power.

(Operation of Radio Communication Terminal)

Figure 11:
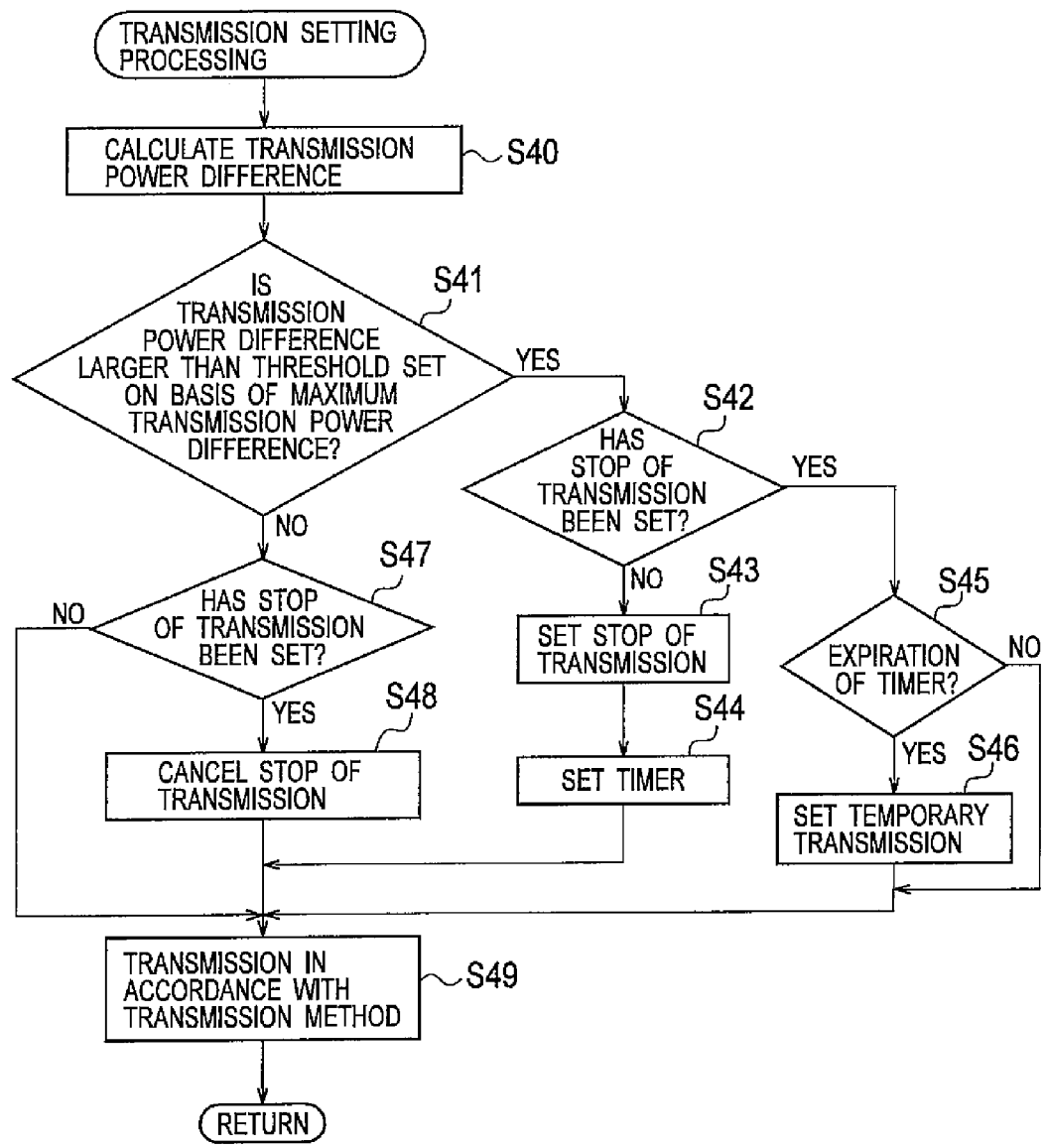
FIG. 11 is a flowchart showing operation of a radio communication terminal 10 according to a third embodiment of the present invention.

The operation of the radio communication terminal according to the third embodiment of the present invention will be described hereinafter with reference to the drawings. FIG. 11 is a flowchart showing the operation of the radio communication terminal 10 according to the third embodiment of the present invention. Note that the transmission setting processing shown in FIG. 11 is performed instead of the aforementioned transmission setting processing shown in FIG. 7.

As shown in FIG. 11, in step 40, the radio communication terminal 10 calculates a difference between transmission powers of reverse link data (transmission power difference) for adjacent carriers (the carrier #1 and the carrier #2).

In step 41, the radio communication terminal 10 determines whether or not the transmission power difference between the adjacent carriers exceeds a threshold set on the basis of a maximum transmission power difference (MaxRLTxPwrDiff). The radio communication terminal 10 moves to the processing of step 42 when the transmission power difference between the adjacent carriers exceeds the threshold set on the basis of the maximum transmission power difference. Moreover, when the transmission power difference between the adjacent carriers does not exceed the threshold set on the basis of the maximum transmission power difference, the radio communication terminal 10 moves to the processing of step 47.

Here, as described previously, the threshold to be set on the basis of a maximum transmission power difference may be equal to the maximum transmission power difference or may be a value smaller than the maximum transmission power difference (such as a value obtained by multiplying the maximum transmission power difference by a predetermined ratio (0.9)).

In step 42, the radio communication terminal 10 determines whether or not stop of transmission has been set as the reverse link data transmission method using the adjacent carriers. In a case where the stop of transmission has been set, the radio communication terminal 10 moves to the processing of step 45. On the other hand, in a case where the stop of transmission has not been set, the radio communication terminal 10 moves to the processing of step 43.

In step 43, the radio communication terminal 10 sets the stop of transmission as the reveres link transmission data transmission method for one of the adjacent carriers.

In step 44, the radio communication terminal 10 sets a timer to a predetermined wait time. Here, the predetermined wait time is a period of time shorter than a period of non-communication time used for the radio base station 100 to determine whether or not to provide an instruction to disconnect a carrier to the radio communication terminal 10, and also, is a period of time allowable to maintain one of the adjacent carriers that has a larger transmission power. Note that disconnecting of a carrier refers to the stop of transmission using the carrier.

In step 45, the radio communication terminal 10 determines whether or not the predetermined period of time set on the timer has passed. In a case where the predetermined period of time set on the timer has passed, the radio communication terminal 10 moves to the processing of step 46. On the other hand, in a case where the predetermined period of time set on the timer has not passed, the radio communication terminal 10 moves to the processing of step 49.

In step 46, the radio communication terminal 10 sets a temporary transmission as the reverse link data transmission method. In the temporary transmission, reverse link data using one of adjacent carriers that has a larger transmission power is temporarily transmitted. Note that the temporary transmission is to transmit reverse link data that requires a short transmission time in order to maintain the one of the adjacent carriers that has a larger transmission power, as shown in FIG. 12. In addition, in the temporary transmission, the radio communication terminal 10 transmits the reverse link data with a transmission power not causing the transmission power difference between the adjacent carriers to exceed a maximum transmission power difference.

In step 47, the radio communication terminal 10 determines whether or not the stop of transmission has been set as the transmission method of the reverse link data using one of the adjacent carriers. In a case where the stop of transmission is set, the radio communication terminal 10 moves to the processing of step 48. On the other hand, the radio communication terminal 10 moves to the processing of step 49 in a case where the stop of transmission has not been set.

In step 48, the radio communication terminal 10 sets cancelling of the stop of transmission as the reverse link data transmission method.

In step 49, the radio communication terminal 10 transmits reverse link data in accordance with the transmission method set in one of steps 43, 46 and 48.

Note that when the stop of transmission of reverse link data is not canceled during the predetermined period of time, that is, when the transmission power difference between the adjacent carriers does not decrease to a value equal to or less than the threshold set on the basis of the maximum transmission power difference after elapse of predetermined period, the radio communication terminal 10 disconnects the one of the adjacent carriers that has a larger transmission power.

(Action and Effect)

With the radio communication terminal 10 according to the third embodiment of the present invention, when a transmission power difference between adjacent carriers exceeds a threshold set on the basis of a maximum transmission power difference, the radio communication terminal 10 stops the transmission of reverse link data using one of the adjacent carriers that has a larger transmission power for a predetermined period until the transmission power difference between the adjacent carriers decreases to a value equal to or less than the threshold set on the basis of the maximum transmission power difference.

Thus, communications by multicarrier can be maintained while interference between adjacent carriers which are adjacent to each other with a predetermined frequency interval is controlled.

In addition, even in a case where the transmission of reverse link data using one of the adjacent carriers that has a larger transmission is stopped, the radio communication terminal 10 performs a temporary transmission of the reverse link data when a period of time set on the timer passes.

Thus, it is possible to suppress disconnection of one of carriers that has a larger transmission power.

[Other Embodiments]

As described above, content of the present invention was disclosed through an embodiment of the present invention. However, it should not be construed that the description and drawings constituting a part of this disclosure will limit the present invention. Various alternative embodiments will be apparent to those skilled in the art from this disclosure.

For example, in the aforementioned first to third embodiments, an intermittent transmission is set as a reverse link data transmission method on the basis of determination as to whether or not a transmission power difference between adjacent carriers exceeds a threshold set on the basis of a maximum transmission power difference. However, the present invention is not limited to this.

Specifically, the intermittent transmission maybe set as the transmission method for reveres link data on the basis of determination as to whether or not a transmission power difference between two carriers that are not adjacent to each other exceeds a certain threshold set.

In this case, a predetermined threshold is defined in accordance with the distance between the center frequencies of the two carriers being apart from each other. Specifically, as the center frequencies of the two carriers are apart from each other farther, the two carriers interfere with each other to a lower extent. Thus, the predetermined threshold is defined at a low value.

In addition, the operation of the radio communication terminal 10 according to the aforementioned first to third embodiments can be provided as a program executable on a computer.

Moreover, although it is not particularly mentioned in the first to third embodiments described above, for the intermittent transmission setting, the number of slots to stop transmission of reverse link data using one of adjacent carriers that has a larger transmission power may be set. Note that transmission of reverse link data using one of carriers that has a smaller transmission power is performed in a slot in which transmission of reverse link data using a carrier having a larger transmission power is stopped.

In this case, it is preferable that the larger the transmission power difference between adjacent carriers, the larger the number of slots to stop transmission of reverse link data using a carrier having a larger transmission power be set.

As described, the present invention contains various embodiments that have not been described herein, as a matter of course. Thus, a technical scope of the present invention shall be defined only by inventive specific matters according to the claims that are reasonable from the above description.

INDUSTRIAL APPLICABILITY

As described above, the radio communication method and the radio communication terminal according to the present invention can maintain communications by multicarrier while controlling interference between adjacent carries that are adjacent to each other with a predetermined frequency interval. Accordingly, they are useful in radio communications such as mobile communications.

The invention claimed is:

1. A radio communication method in reverse link by multicarrier using at least a first carrier and a second carrier that is adjacent to the first carrier with a predetermined frequency interval, the method comprising the steps of:

calculating a transmission power difference in a predetermined cycle between a transmission power value of the first carrier and a transmission power value of the second carrier;

determining whether the transmission power difference exceeds a threshold set on the basis of a maximum transmission power difference allowable between the first carrier and the second carrier;

stopping a transmission of reverse link data using one of the first carrier and the second carrier with a larger transmission power value for a certain period, in a case where the transmission power difference exceeds the threshold set on the basis of the maximum transmission power difference; and determining whether the transmission power difference is increasing, on the basis of the transmission power differences calculated in the predetermined cycle, wherein in the step of stopping the transmission of the reverse link data, the transmission of reverse link data using one of the first carrier and the second carrier with a larger transmission power value is stopped for a certain period, in a case where the transmission power difference is determined as increasing.

2. A radio communication terminal performing communications by multicarrier using at least a first carrier and a second carrier that is adjacent to the first carrier with a predetermined frequency interval, the radio communication terminal comprising:

a transmission power difference calculator configured to calculate a transmission power difference in a predetermined cycle between a transmission power value of the first carrier and a transmission power value of the second carrier;

a transmission power difference determination unit configured to determine whether the transmission power difference calculated by the transmission power difference calculator exceeds a threshold set on the basis of a maximum transmission power difference allowable between the first carrier and the second carrier;

a communication controller configured to stop a transmission of reverse link data using one of the first carrier and the second carrier with a larger transmission power value for a certain period, in a case where the transmission power difference determination unit determines that the transmission power difference exceeds the threshold set on the basis of the maximum transmission power differenceand a power difference tendency determination unit configured to determine whether the transmission power difference is increasing, on the basis of the transmission power differences calculated by the transmission power difference calculator in the predetermined cycle, wherein the communication controller stops the transmission of the reverse link data using one of the first carrier and the second carrier with a larger transmission power for a certain period in a case where the power difference tendency determination unit determines that the transmission power difference is increasing.

* * * * *